(12) United States Patent
Grocutt et al.

(10) Patent No.: US 9,122,890 B2
(45) Date of Patent: Sep. 1, 2015

(54) SECURE MECHANISM TO SWITCH BETWEEN DIFFERENT DOMAINS OF OPERATION IN A DATA PROCESSOR

(71) Applicant: ARM LIMITED, Cambridge (GB)

(72) Inventors: Thomas Christopher Grocutt, Cambridge (GB); Stuart David Biles, Cambridge (GB); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 45 days.

(21) Appl. No.: 14/019,580

(22) Filed: Sep. 6, 2013

(65) Prior Publication Data

US 2014/0075581 A1 Mar. 13, 2014

(30) Foreign Application Priority Data

Oct. 1, 2012 (GB) .................................... 1217531.1
Aug. 2, 2013 (GB) .................................... 1313869.8

(51) Int. Cl.
*G06F 21/00* (2013.01)
*G06F 21/62* (2013.01)
*G06F 21/50* (2013.01)
*G06F 21/52* (2013.01)
*G06F 21/54* (2013.01)
*G06F 21/55* (2013.01)

(52) U.S. Cl.
CPC ............. *G06F 21/629* (2013.01); *G06F 21/50* (2013.01); *G06F 21/52* (2013.01); *G06F 21/54* (2013.01); *G06F 21/554* (2013.01); *G06F 2221/2105* (2013.01)

(58) Field of Classification Search
CPC ......... G06F 21/50; G06F 21/51; G06F 21/52; G06F 21/54
USPC ................................................ 726/22, 26, 30
See application file for complete search history.

(56) References Cited

U.S. PATENT DOCUMENTS 4,087,856 A * 5/1978 Attanasio ........................ 726/23
8,010,772 B2 8/2011 Kershaw et al.
(Continued)

FOREIGN PATENT DOCUMENTS

GB 2 448 149 10/2008

OTHER PUBLICATIONS

R. Vasuki, "Microchip. CodeGuard™ Security: Protecting Intellectual Property in Collaborative Systems Designs" 2006, pp. 1-14.

(Continued)

*Primary Examiner* — Edward Zee
(74) *Attorney, Agent, or Firm* — Nixon & Vanderhye P.C.

(57) ABSTRACT

A data processing apparatus including processing circuitry having a secure domain and a further different secure domain and a data store for storing data and instructions. The data store includes a plurality of regions each corresponding to a domain, and at least one secure region for storing sensitive data accessible by the data processing circuitry operating in the secure domain and not accessible by the data processing circuitry operating in the further different secure domain and a less secure region for storing less sensitive data. The processing circuitry is configured to verify that a region of the data store storing the program instruction corresponds to a current domain of operation of the processing circuitry and, if not, to verify whether the program instruction includes a guard instruction and, if so, to switch to the domain corresponding to the region of the data store storing the program instruction.

21 Claims, 9 Drawing Sheets

(56) References Cited

U.S. PATENT DOCUMENTS

2004/0168047 A1    8/2004   Fukai et al.
2008/0184016 A1    7/2008   Erlingsson et al.
2008/0250216 A1*  10/2008   Kershaw et al. .............. 711/163
2013/0036464 A1    2/2013   Glew et al.

OTHER PUBLICATIONS

Microchip Technology Inc., "Microchip. Section 23. CodeGuard™ Security" 2007, pp. 23-1 to 23-40.

International Search Report and Written Opinion of the International Searching Authority dated Jan. 16, 2014 in PCT/GB2013/052423.

UK Search Report dated Jan. 24, 2014 in GB 1313869.8.

M. Budiu et al, "Architectural Support for Software-Based Protection" Proceedings of the $1^{st}$ Workshop on Architectural and System Support for Improving Software Dependability, ASID '06, Oct. 2006, 10 pages.

International Preliminary Report on Patentability dated Oct. 20, 2014 in PCT/GB2013/052423, 16 pages.

* cited by examiner

SECURE MECHANISM TO SWITCH BETWEEN DIFFERENT DOMAINS OF OPERATION IN A DATA PROCESSOR

This application claims priority to GB Application No. 1217531.1 filed Oct. 1, 2012 and GB Appliction No. 1313869.8 filed Aug. 2, 2013, the entire contents of each of which are incorporated herein by reference.

FIELD OF THE INVENTION

The present invention relates to the field of data processing and in particular to a data processing apparatus and method that use different secure domains.

BACKGROUND OF THE INVENTION

Many data processing systems and architectures provide ways of isolating and protecting sensitive data and sections of code from access by unauthorised persons or processes. Although it is important to be able to provide security there is an overhead in performance and circuit area associated with this protection.

One way of keeping data and code secure is provided by ARM® of Cambridge UK, with their TrustZone® architecture where there are secure and non-secure states and an exception instruction is used to transition between the states, the exception handler protecting the security of the secure side. Although this approach provides a high degree of security, considerable software intervention in the form of the software exception handler is required to change security states which both reduces the performance of the system and increases the amount of effort required to develop an external application program interface API for the secure software as all calls must be proxied through the exception hander.

For small systems such as microcontrollers the overheads present in TrustZone systems may not be tolerable, and so different methods for transitioning between states must be found that offer increased performance without compromising security.

One way of switching from a less secure to a more secure domain that has relatively low overheads and allows multiple entry points to the secure state uses a branch instruction to branch from the public domain to a function in the private domain. The function may contain a security checking routine at the start that checks that the process calling it has sufficient privileges to allow it to call the function, thus there may be password or other checks performed.

One way to avoid this checking would be to branch into the code at a point beyond the security checking routine. Another attack may involve branching into a private function towards the end of the function, and this may only result in the execution of one or two instructions before the function branches back to the public side. However, if this can be performed a multiple number of times, a function can be built up in what is termed return oriented programming.

U.S. Pat. No. 8,010,772 a patent granted to ARM® Ltd of Cambridge UK discloses a way of inhibiting the ability of an attacker to jump to the middle of a function with the use of a permitted instruction located at the start of such a function, the processing circuitry verifying that a branch instruction from a less secure domain branches to this permitted instruction when it branches to a more secure domain. A disadvantage of this system is that it requires the processor to know that the instruction that sent it to the permitted instruction was a branch instruction from a less secure domain.

FIG. 1 shows an example of program code in which there is a branch from a public side to a permitted instruction PG on the private side. Where, as is shown in FIG. 1, an exception occurs between the branch instruction and the permitted instruction, as this causes exception handling code to be executed before the PG instruction the processor will not be able to determine in any straightforward manner which instruction caused it to branch. One way to address the problem of an exception occurring at this point would be with the use of a flag that could be set when the branch instruction is executed such that even if an exception occurs the later instruction will know that a branch from the less secure domain had occurred earlier and had not yet been checked. However, this leads to potential security implications as the flag itself could be tampered with.

It would be desirable to improve the security of switching between states in a processing efficient manner.

SUMMARY OF THE INVENTION

Viewed from a first aspect, the present invention provides a data processing apparatus comprising:

processing circuitry for performing data processing operations in response to program instructions, said processing circuitry having a plurality of domains of operation having different secure levels, comprising a secure domain and a further different secure domain, wherein when operating in said secure domain said processing circuitry has access to at least some data that is not accessible in said further different secure domain;

a data store for storing data and instructions, said data store comprising a plurality of regions, each region corresponding to one of said plurality of domains of operation, and comprising at least one secure region for storing sensitive data accessible by said data processing circuitry operating in said secure domain and not accessible by said data processing circuitry operating in said further different secure domain and a less secure region for storing less sensitive data;

said processing circuitry being configured:

to verify for a program instruction to be executed that a region of said data store storing said program instruction corresponds to a current domain of operation of said processing circuitry; and in response to detecting that said program instruction is stored in a region of said data store does not correspond to said current domain of operation of said processing circuitry;

to verify whether said program instruction comprises a guard instruction; and if said program instruction comprises said guard instruction to switch said domain of operation to a domain corresponding to said region of said data store storing said program instruction; and if said program instruction does not comprise said guard instruction to generate a security violation indication.

The present invention recognises the security implications which arise when switching between processing different secure domains some of which may have different secure levels. In this regard, many processing circuits operate in domains having different secure levels, access to some sensitive data only being available when operating in more secure domains. The different domains may have different levels of security, or they may be sibling domains having the same level of security and yet being isolated from each other. In general, processing operations in a more secure domain will have access to data in less secure regions of memory and in correspondingly secure regions of memory. Where there are sibling domains that are different but have the same secure level, then they both have access to the same less secure regions of the data store but not to data of the same sensitivity that is stored in regions of memory of their secure level that does not correspond to their domain but rather corresponds to the sibling domain. The program instructions being processed are also stored within different secure regions of a data store, the secure level of the region of the data store where instructions currently being executed are stored, generally corresponding to the secure level of the current domain of operation. In this regard there are also regions of memory that correspond to the sibling domains. Thus, if the processing circuitry determines that an instruction to be executed has been retrieved from a region corresponding to a different domain to that of the current domain of operation, then this is an indication that either there is a problem or if the instruction retrieved is a guard instruction then a domain switch should occur.

In this regard, it should be noted that although sensitive data that is stored in a more secure region of the data store than the secure level of the current domain of operation may not be accessible to the processing circuitry, instructions that are stored in a more secure region or in a sibling secure region can be fetched. This is because access permissions are set differently for data accesses and instructions fetches as instructions fetches do not present the same security implications as data accesses do, instruction fetches not being visible to the software. Although there may not be security implications associated with fetching instructions stored in a more or different secure region, there may well be security implications associated with executing them.

Thus, on fetching an instruction a check is made to see if the region of the data store that it was fetched from corresponds to the current domain of operation. If it does not, then it is determined whether the program instruction is a guard instruction or not. If it is a guard instruction then the processing circuitry switches to the domain of operation corresponding to the region of the data store that the guard instruction was retrieved from, whereas if the instruction is not a guard instruction then a security violation indication is generated.

In this way, domain switches triggered by a branch to an instruction in a different domain are only permitted via a guard instruction. This ensures that a switch in domain only occurs at a guard instruction while avoiding the processing circuitry needing to have any knowledge of how it arrives at the guard instruction, it simply needs to know its current domain of operation and the domain corresponding to the region that the next instruction to be executed is stored in. This works because no domain switch occurs until after the guard instruction has been accessed and thus, the domain of operation prior to a switch is known as that is the current domain of operation and the presence of the guard instruction is sufficient to indicate that a switch is acceptable. Furthermore, as it is the fetching of an instruction from a region of memory that does not correspond to the current domain of operation that triggers the checking of the instruction and possible domain change if it is a guard instruction, the checking and domain change are performed as a single atomic operation, meaning that the operation cannot be interrupted part way through.

If an instruction is accessed that is in a region corresponding to a different domain and it is not a guard instruction then a security violation indication is generated.

It should be noted that although the domains and data store may have corresponding secure levels, there may not be a one to one relationship. In this regard there may be more secure levels in the data store regions than there are domains of operation of the processing circuitry. Each region will correspond to a domain though, thus there may be two processing domains, a public and private domain and four regions of the data store, a public region that corresponds to the public domain, and three different secure regions of memory having different levels of security each corresponding to the private domain, such that a guard instruction stored in any one of the private regions will trigger a switch to processing in the private domain.

Although in some embodiments the further different secure domain and the secure domain may be sibling domains with the same secure level, in other embodiments all domains have different secure levels, and said further different secure domain comprises a domain that is less secure than said secure domain.

In some embodiments, said processing circuitry is configured to verify whether said program instruction comprises a guard instruction only in response to detecting that said program instruction is stored in a region of said data store that has a more secure level to said secure level of a current domain of operation of said processing circuitry.

In some embodiments, in response to said program instruction being stored in a region of said data store that corresponds to a domain that has a less secure level to said secure level of a current domain of operation, said processing circuitry is configured to switch said domain of operation to said less secure level whether or not said instruction comprises said guard instruction.

Although, the guard instruction may be used to control switching between different secure levels in general, in some embodiments it is only used when switching from a less to a more secure domain. Clearly security issues arise more often when switching from a less to a more secure domain and thus, it is important on this switch that you switch at a predetermined point such that any security checks that need to be performed will be performed. Thus, a guard instruction is particularly useful to control switching from a less to a more secure domain and in some cases the processing circuitry only checks for a guard instruction where the region of the instruction is a more secure level and domain switches to less secure levels are always allowed.

However, in other cases particularly where there are more than two domains then switching to a quite secure domain either from the less or more secure domain is efficiently managed if it is performed in the same way, that is via a guard instruction. Providing this symmetry makes the writing of the software for controlling such a switch more straightforward and the code more efficient.

In some embodiments, said processing circuitry is responsive to said security violation indication to generate an exception and execute fault handling code.

If an instruction from a region of the data store corresponds to a different domain is not a guard instruction then different secure operations may be performed. For example, an exception may be generated and then fault handling code may be run which recognises that the software currently being executed is probably attack software and should not be allowed access to the secure side of the processor. In more secure systems there may be other operations performed such as shutting down the processor or even in some extreme cases destroying the circuitry itself.

In some embodiments, said processing circuitry is configured to execute program instructions from an instruction set having different length instructions, instruction address alignment required by said processing circuitry being dependent upon said different lengths, said guard instruction having a length that is long enough such that if a start of the guard instruction were located at one of at least a subset of said address alignment points that is within one of said program instructions then a portion of said guard instruction will overlap with a start of a next instruction.

It is clearly important that guard instruction cannot be inadvertently mimicked using other code. Where instruction sets have instructions of different lengths then the processing circuitry can access the instructions at certain address alignment points that are governed by the different lengths of the instructions. It may be that an instruction is accessed part way through at one of these address alignment points which will at times occur within instructions owing to their different lengths. This can create problems as although the instruction set may have been written such that the guard instruction has unique code when compared to other instructions it may not be unique when compared to a part of one instruction. This could provide inadvertent entry points to a differently secure domain by branching into an instruction at one of the address alignment points that is not at the start of the instruction. Finding useful code sequences by deliberately branching into instructions is a common technique when performing return oriented programming attacks.

Ensuring that any part of an instruction of combination of parts of neighbouring instructions cannot mimic a guard instruction can require a large amount of encoding space to be reserved for the guard instruction. This potential problem has been addressed by providing a guard instruction that is long enough such that it will overlap the start of the next instruction if it starts within another instruction. In this way the amount of encoding space that must be reserved for the guard instructions such that it cannot inadvertently be mimicked is reduced.

Although in some embodiments it may only be a subset of address alignment points that need to be considered, for example where some address alignments do not lead to mimicking hazards due to encoding constraints, in other embodiments it may be all address alignments points that need to be taken into account when determining the required length of the guard instruction to ensure overlap with the next instruction when starting within another instruction.

In some cases this means that the length of the guard instruction is equal to a length of a longest program instruction from the instruction set.

The above is likely to be the case for example where there are two lengths of instructions and one is double the other. In such a case, to ensure that if the instruction is not correctly aligned with the beginning of an instruction then it always overlaps the next instruction, then it must have the length of the longest program instruction.

In some embodiments, a value of any portion of said guard instruction that may overlap with another instruction from said instruction set when aligned with said address alignment required by said processing circuitry is not a valid operation code or start of an operation code for any other instruction from said instruction set.

One way of avoiding inadvertent mimicking is by ensuring that a value of any portion of the guard instruction that may overlap with another instruction should not be a valid operation code or start of an operation code from any other instruction from the instruction set. The amount of encoding space that is required to be reserved for the guard instruction increases with the non-alignment possibilities of instructions as in such a case there may be just a portion of the operation code that overlaps with the guard instruction and thus, this portion also needs also to be reserved such that it does not inadvertently mimic the guard instruction.

One way of addressing this is to encode the guard instruction in portions that are equal to the lengths of the smallest distance between the instruction address alignment points and then provide these portions with the same value. As it is this value that will overlap with other instructions then if the same value is used, it is just this value that needs to be avoided for use as the op-code or start of the op-code of the other instructions. In this way, the amount of encoding space that is reserved for the guard instruction is reduced.

In some cases, for example, where you have two instruction lengths, one being twice the other then the guard instruction will comprise two portions and will in effect be symmetrical and the value in the two portions will be a value that is not a value that is used by the op-codes or start of the op-codes of any of the other instructions in the instruction sets.

In some embodiments, said same value is not a valid operation code or start segment of an operation code for any other instruction from said instruction set.

As noted before this same value should not be a valid operation code or in fact even the start segment of an operation code for any other instructions on said instruction set.

In some embodiments said data store is configured not to store any data values as literals within program code that have the same value as the guard instruction.

Stopping the operation codes of instructions from the instruction sets inadvertently mimicking the guard instruction is one thing, but in some program codes data values are stored as literals within the program code, these literals being stored in various addresses which are accessed by the instructions within the code. In this sort of program code the literals may also be a target of a branch during an attack and thus, it is important that these also do not inadvertently mimic the guard instruction. Thus, in some embodiments there is a process to ensure that no data values are stored as literals within the program code that have the same value as the guard instruction.

In some embodiments, the generation of a matching literal can be avoided at code generation time; for example a compiler can be configured to detect the case where a literal access fetches a matching literal and change the code generated in order to remove the requirement to emit the matching literal value in the literal pool. In one embodiment, the compiler can form the desired value in a processor register by combining the values of a number of non-matching literal accesses using data processing operations. For example, if the matching literal is a four this can be changed to a 2 multiplied by a two. In another embodiment, the compiler can form the desired value by using a sequence of move immediate and data processing operations.

In some embodiments, a program executable may be scanned post-generation in order to detect literal values that have the same value as the guard instruction. In some embodiments the scanning process may be part of the program development process and used as a check prior to distributing software. In other embodiments, the scanning process may be performed as an executable is loaded for execution and have the effect of preventing the program from being executed if a matching literal value is found.

In some embodiments, said data processing apparatus is configured to segment said data store such that at least one predetermined section of said data store is allowed to validly store said guard instruction, said data processing circuitry being configured to generate a security violation indication in response to detecting said guard instruction located in a segment of said data store that is not said at least one predetermined section.

Another way of preventing the guard instruction from being inadvertently mimicked is to segment the data store and only store it in predetermined sections. If this happens then it is only these sections that need to be monitored to check that they do not inadvertently store a guard instruction. When branching to a guard instruction a check will be made to check that the region of the data store that is accessed is a predetermined section and if it is not a security violation indication will be generated. This reduces the amount of code that needs to be checked to ensure that it does not store a guard instruction in the form of a literal, but it does have an overhead of needing to segment the data store and indicate this segmentation in some way.

In some embodiments, portions of said program code that can be called by less secure code are stored in said at least one predetermined section.

The guard instruction will only occur in certain portions of the code. In some embodiments where guard instructions are only used for switching from a less to a more secure domain, this portion of the code will be code that can be called by less secure functions. If this is the case, then storing these portions of code within the predetermined sections means that the guard instruction will always be located within these sections.

Alternatively and/or additionally, said data store is configured to store only instructions in said at least one predetermined section.

As noted previously although it is fairly straightforward to avoid instructions from inadvertently mimicking the guard instruction, avoiding data literals from doing so is more difficult as data literals can have any value. Thus, one way of addressing this is to segment the data store and in the predetermined sections in which the guard instruction may be found, only instructions can be stored. In other words, data literals are not allowed in these sections of the code. Compiling code to avoid having data literals within it has a significant impact on code size and speed. However, where it is only certain sections of code that may contain the guard instruction that need to be compiled in this way, then the overall effect on performance and code size is low.

In some embodiments, said data processing apparatus comprises memory access control circuitry for controlling access to said data store, said memory access control circuitry being configured to indicate said at least one predetermined section of said data store by setting a memory attribute marker within said memory access control circuitry.

One way of marking a predetermined section is by marking it with an attribute marker within the memory access control circuitry. Generally memory access control circuitry is present to control accesses to differently secure sections of the data store and the attributes of the sections of data store are stored within the memory access control circuitry which will compare the address of a access request with the addresses of the various regions and determine which attributes that particular address has and whether or not the access should be allowed. An additional memory attribute marker can be used to indicate that a particular section of the data store is a predetermined section that is allowed to store the guard instruction.

Another way of marking a predetermined section is for the memory access control circuitry to be configured with a fixed address map with areas of the address space mapped as being predetermined sections. In some embodiments, said processing circuitry is configured to process said guard instruction as a domain switching instruction and in response to said guard instruction, to switch said domain of operation to a domain corresponding to said region of said data store storing said guard instruction Although, the processing circuitry may be configured to switch domains in response to detecting an instruction that has a suitable value being stored in a region of the data store that corresponds to a domain that is different to the current domain of operation of the processing circuitry, in some cases it is the guard instruction itself which when executed generates control signals controlling the processing circuitry to switch domains to the domain of the region it is stored in.

A second aspect of the present invention provides a data processing method for an apparatus comprising:

processing circuitry for performing data processing operations in response to program instructions, said processing circuitry having a plurality of domains of operation having different secure levels, comprising a secure domain and a further different secure domain, wherein when operating in said secure domain said processing circuitry has access to at least some data that is not accessible in said further different secure domain, and a data store for storing data and instructions, said data store comprising a plurality of different secure regions, each region corresponding to one of said plurality of domains of operation; the method comprising verifying for a program instruction to be executed, that a domain of a region of said data store storing said program instruction corresponds to a current domain of operation of said processing circuitry; and in response to detecting that said program instruction is stored in a region of said data store that does not correspond to said current domain of operation of said processing circuitry;

verifying whether said program instruction comprises a guard instruction; and if said program instruction comprises said guard instruction switching said domain of operation to a domain corresponding to said region of said data store storing said program instruction; and if said program instruction does not comprise said guard instruction generating a security violation indication.

A third aspect of the present invention provides a data processing apparatus comprising:

processing means for performing data processing operations in response to program instructions, said processing means having a plurality of domains of operation having different secure levels, comprising a secure domain and a further different secure domain, wherein when operating in said secure domain said processing means has access to at least some data that is not accessible in said further different secure domain;

a data storage means for storing data and instructions, said data storage means comprising a plurality of regions each corresponding to one of said plurality of domains of operation, and comprising at least one secure region for storing sensitive data accessible by said data processing means operating in said secure domain and not accessible by said data processing means operating in said further different secure domain and a less secure region for storing less sensitive data;

said processing means being for:

verifying for a program instruction to be executed that a region of said data storage means storing said program instruction corresponds to a current domain of operation of said processing means; and in response to detecting that said program instruction is stored in a region of said data storage means that that does not corresponds to said current domain of operation of said processing means;

verifying whether said program instruction comprises a guard instruction; and if said program instruction comprises said guard instruction switching said domain of operation to a domain corresponding to said region of said data storage means storing said program instruction; and if said program instruction does not comprise said guard instruction to generating a security violation indication.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
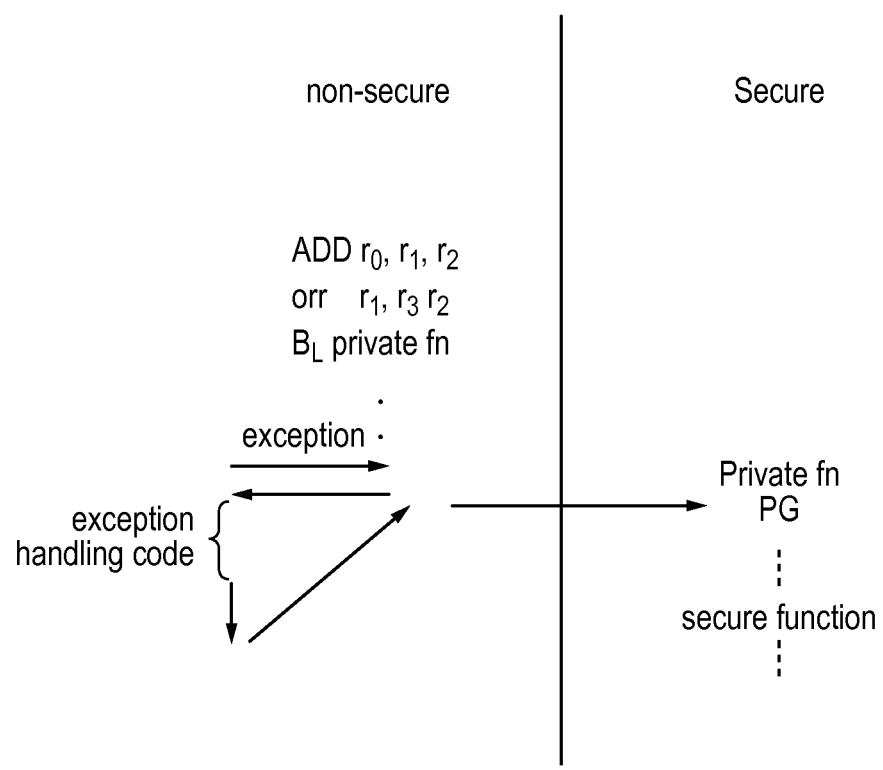
FIG. 1 shows an instruction stream showing a switch of domains in the prior art.
Figure 2:
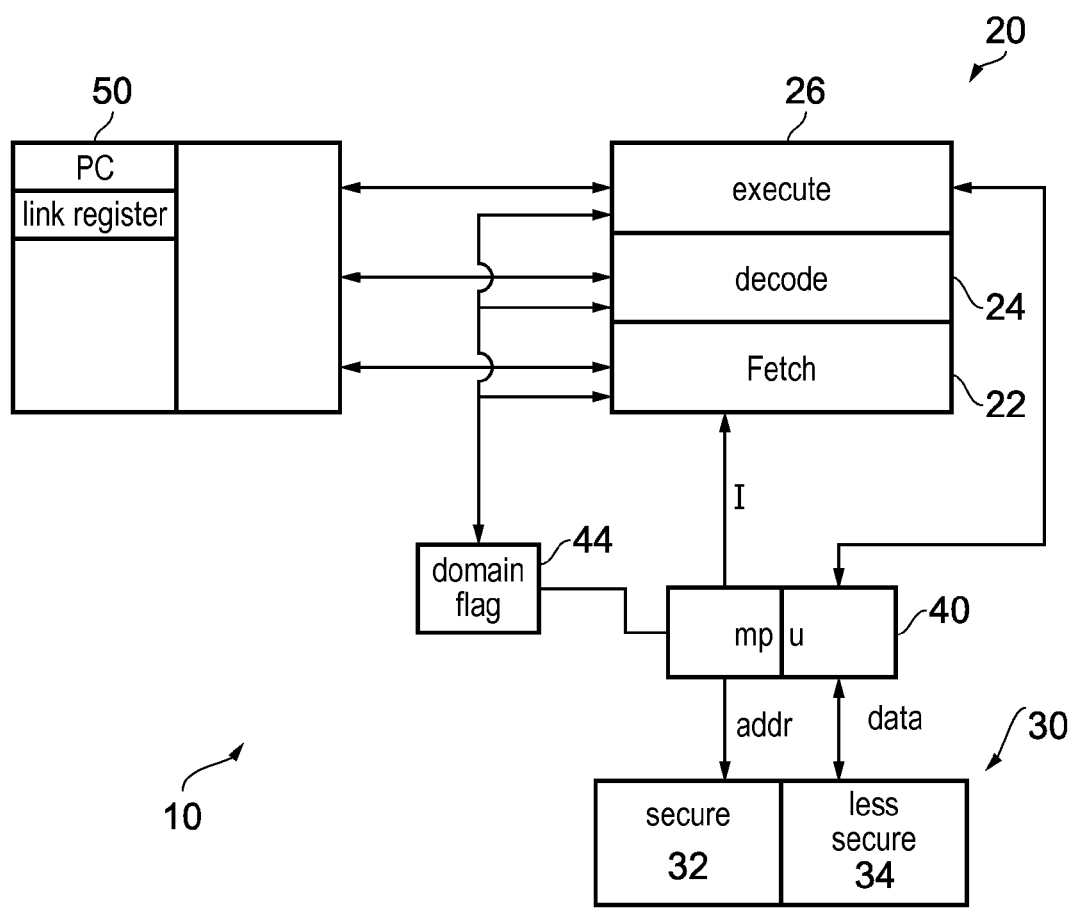
FIG. 2 shows a data processing apparatus according to an embodiment of the present invention.

FIG. 2 shows a data processing apparatus 10 according to an embodiment of the present invention which may for example be a microcontroller. It comprises processing circuitry 20 for processing instructions and a data store 30 for storing data that is processed by the processing circuitry 20 and also for storing the program code that the processing circuitry 20 executes.

The program code may be compiled code, or it may be code that is compiled on the processing apparatus by a compiler (not shown). The program code is formed of program instructions that control the processing circuitry 20 to perform different tasks.

In this embodiment the processing circuitry 20 is in the form of a pipeline having an instruction fetch stage 22, an instruction decode stage 24 and an instruction execute stage 26. As will be appreciated this is a simplified view and there may be further stages such as register renaming stages. The processing circuitry will have a domain of operation that is either secure or less secure and in this embodiment this is generally determined by the security level of the data store region that code that is being executed is stored in.

Data store 30 has two regions of different security, a secure region 32 and a less secure region 34. Data stored in the secure region 32 is not accessible to code that is stored in the less secure region 34 when it is executing. Instructions stored in the secure region 32, may however be fetched by the fetch stage 22 of processing circuitry 20 when it is operating in a less secure domain as the instructions are not visible to the software and thus, access to instructions across domains is permitted.

Although the data store is shown as a single block, it is in many cases formed of several types of data storage having different hierarchies, such as different level caches and main memory. Each of these stores will store data in secure or less secure regions.

Data processing apparatus 10 also has a memory protection unit MPU 40 which controls this segmentation of access permissions. Although this control may be done through a central memory protection unit as is shown, it may in other embodiments be done in a more distributed fashion by circuitry within the processing apparatus that monitors the region code that is currently being executed is stored in, and controls access to the different regions of the memory in dependence upon this.

In this embodiment the MPU has two sections one that controls access to instructions stored in the data store 30 and one that controls access to the data. As noted previously instruction fetches to instructions stored in the secure portion is allowed from processing circuitry executing in the less secure domain.

In this embodiment there is a register bank 50 which has general purpose registers which are used during data processing. These general purpose registers include a program counter PC which indicates which instruction is the next to be executed and other registers with particular functions such as a link register for storing the return address of a branch instruction.

There are also data registers in register bank 50 for storing data values that are being processed. Alternatively, in some embodiments registers are not used for storing data values and the values are stored on the stacks and are accessed indirectly via the stack pointer that is stored in one of the registers. This clearly has an area saving but a performance hit.

As mentioned earlier, in this embodiment the domain that the processing circuitry 20 is executing in is generally determined from the region that the code currently being executed is stored in. Thus, secure program code stored in secure data store 32 is generally executed in the secure domain. The domain of execution is indicated by domain flag 44 that is set by the processing circuitry 20, and is accessed by MPU 40 to determine access permissions.

When the processing circuitry 20 fetches an instruction for execution and the domain flag indicates that it is from a domain that the processing circuitry is not currently executing in, then the processing circuitry 20 will perform a check to verify that the instruction is a guard instruction. It will do this by checking the operation code of the instruction fetched against the known operation code of the guard instruction. If it is the guard instruction this will then be decoded and executed and this will control the processing circuitry to update the domain flag 44 to switch domain to the domain corresponding to the region of memory that the guard instruction was fetched from. Thus, for example if the processing circuitry 20 is currently operating in the less secure domain and a branch is performed such that a guard instruction from the secure region 32 of memory is fetched, then the processing circuitry will switch to executing in the secure domain.

The guard instruction is located at permitted entry points to the secure region and the code that is executed following the guard instruction may comprise a secure checking routine to verify that the call to the secure domain is valid, this may involve the checking of a password, or checking of the validity of other function arguments supplied.

If the instruction fetched is not a guard instruction and is from a secure region that has a domain different to the current domain of operation then a security violation indication will be generated. This may take the form of an exception being generated and a fault handling routine being executed.

Figure 3:
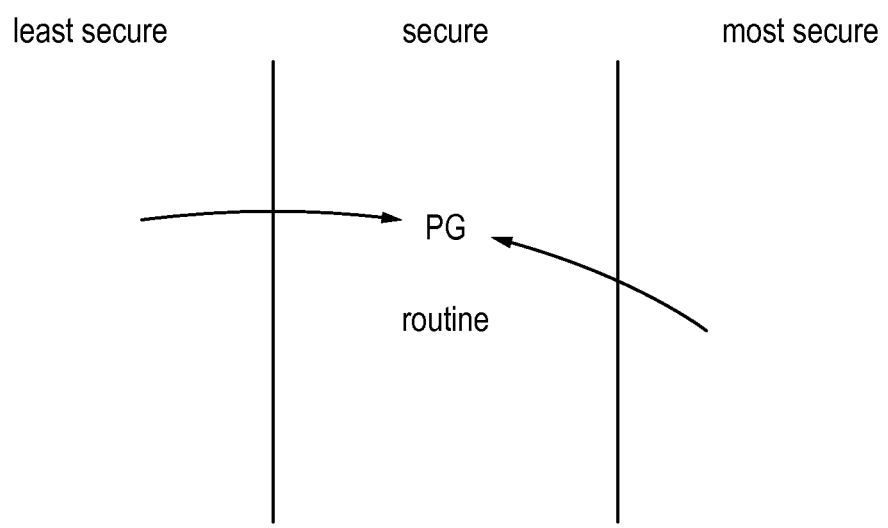
FIG. 3 shows three different secure levels of processing domains.

FIG. 3 shows very schematically three processing domains, a least secure, a secure and a most secure domain. In each of these domains programming code is executed and depending on the domain different levels of secure data from the data stores may be accessed. Permission to access the data is given in dependence on the security level of the domain of execution and the security level of the region of memory where the data is stored. In this embodiment, any switching between domains is performed via the guard instructions shown as PG in this example. Although, in some cases the guard instruction is only required when switching to a more secure from a less secure domain, it may be more efficient to implement a system if this switching requirement is performed symmetrically such that when going from a more secure to a less secure region transfer is also performed via the guard instruction. Thus, when calling a routine in a different secure domain this is done by fetching the guard instruction that is located at the head of the routine.

It should be noted that although in this embodiment the three domains are shown as having different secure levels, in some embodiments, at least two of the domains may be sibling domains that have the same secure level but are isolated from each other. Thus, the secure and most secure domain may actually be secure and secure 2, processing operations in these two secure domains having access to data in the least secure region of memory and to the secure region of memory corresponding to their own domain, but not to their sibling domain.

Figure 4:
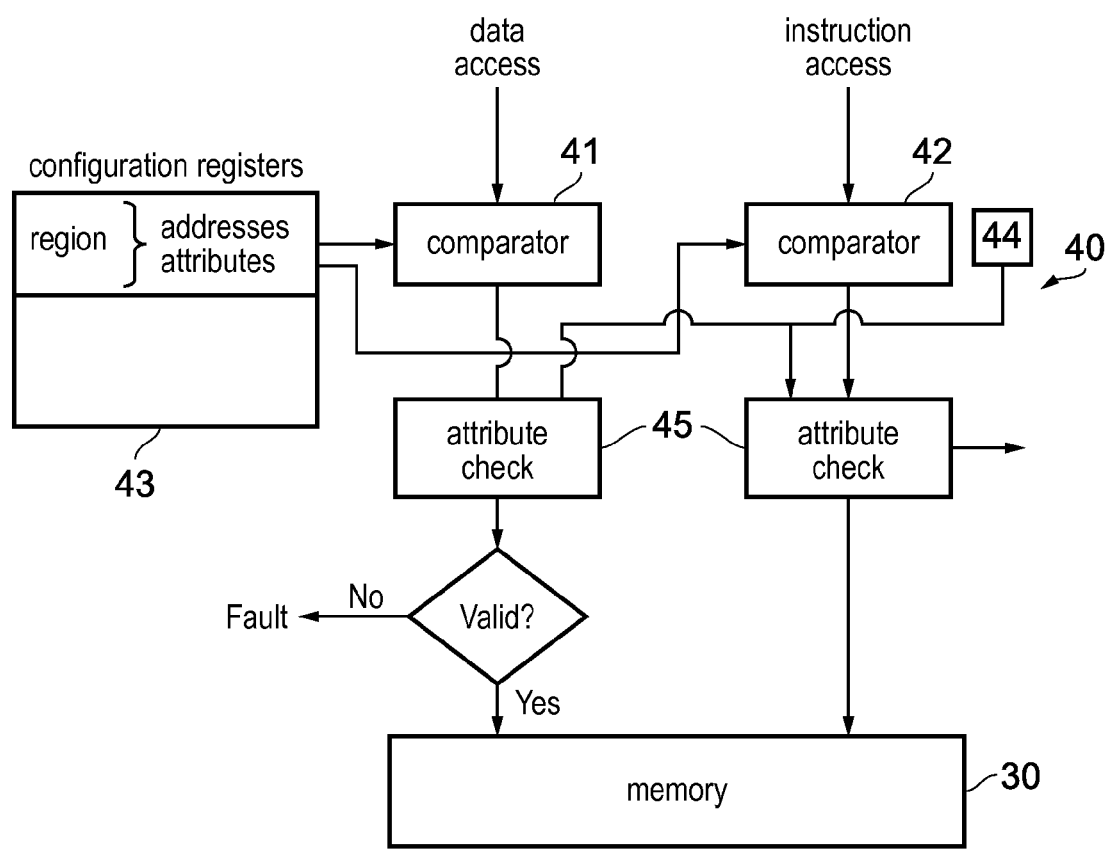
FIG. 4 shows a memory protection unit according to an embodiment of the present invention.

FIG. 4 shows memory protection unit 40 of FIG. 2 in more detail. Memory protection unit MPU 40 controls access to the data store 30 from the processing circuitry 20 and ensures that only regions of data store 30 with appropriate attributes can be accessed.

In this embodiment, data accesses and instruction accesses are received at different ports and can be handled in parallel. Comparators 41 and 42 compare the access address of the data and instruction accesses respectively with the addresses of the regions retrieved from configuration registers 43. Configuration registers 43 store details of the different regions of data store 30. That is they store the addresses of the regions, the size of the regions and the attributes of the regions. These attributes will indicate the security level or the region, whether the region is a read or write only region and other such things. Thus, once the comparators have determined which region of memory the access is directed to, the attribute check blocks 45 will use the attributes for that region stored in the configuration registers 43 to determine whether or not the access is allowed. The attribute check blocks 45 have access to domain flag 44, such that they can determine the secure level of the current domain of operation of processing circuitry 20, when determining if access should be allowed or not. If a data access is determined to be a valid access then the memory can be accessed, if not a fault will be generated.

In this regard, when the instruction access is to an instruction that is within a region of memory that does not correspond to the domain indicated by domain flag 44, then the attribute check will determine this and will signal this to the processing circuitry 20 when it returns the instruction.

The processing circuitry in response to this signal will check to see if the instruction returned is a guard instruction. If it is, the domain flag 44 will be updated to a domain corresponding to the domain of the region of data store 30 the instruction was fetched from, if not a security violation indication is generated by the processing circuitry 20.

As switching between domains is allowed only if a guard instruction is detected then it is important that there is not an inadvertent encoding that could be branched to that would mimic this guard instruction. In instruction sets that have only one instruction size then it may be sufficient to simply have a unique operation code for the guard instruction that is not used by any other instruction. However, where there are literals encoded within the program code then even with a single instruction length care must be taken that the encoding of the guard instruction is not inadvertently stored in the program code section as a literal.

In order to avoid this happening there can be checks on all literals that are stored to check that they do not have the guard instruction encoding. Alternatively, the memory may be segmented such that only particular sections of the memory are allowed to contain the guard instruction. These sections could be banned from storing data literals, alternatively any data literals that are stored in this section could be checked.

Figure 5:
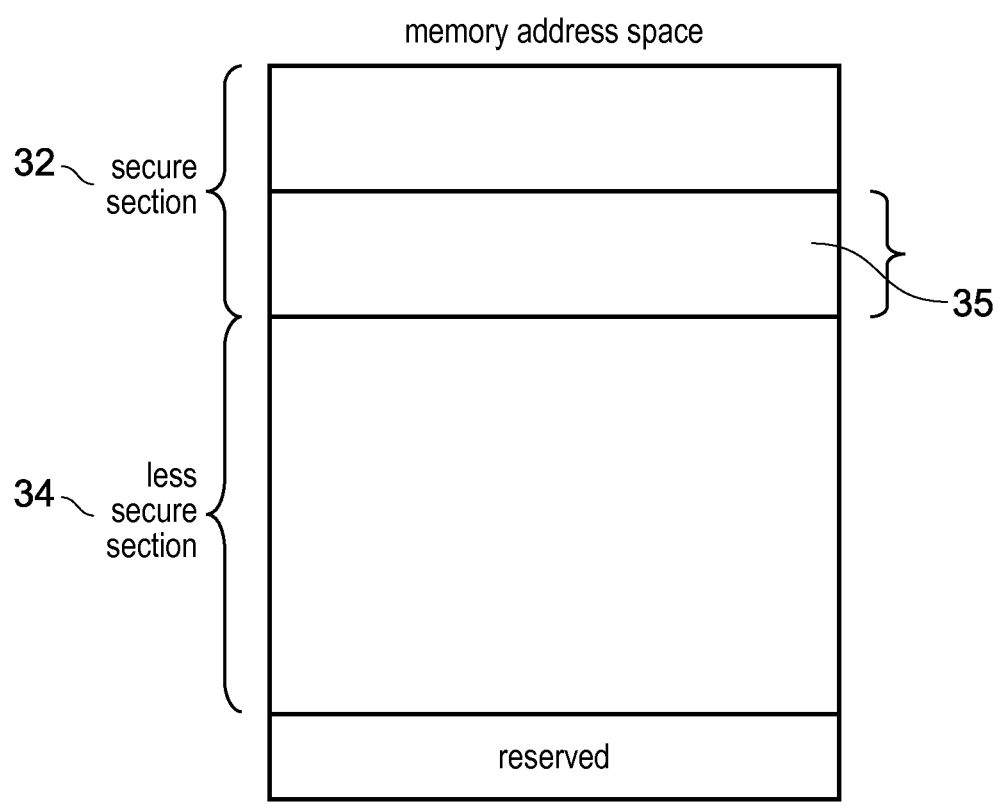
FIG. 5 shows segmentation of a memory address space according to an embodiment of the present invention.

FIG. 5 schematically shows data store 30 segmented in this way. Thus, there is a reserved section, a less secure section 34 and a secure section 32 which has a single section 35 in which the guard instruction can be stored. This section could be marked as having this particular attribute in the configuration registers within the memory protection unit 40. Thus, if the guard instruction is identified stored elsewhere in the data store this will generate a security violation in indication.

Segmenting the memory in this way allows literals to be stored elsewhere in the memory without the need to check that they do not inadvertently have the guard instruction encoding. The system may be arranged such that in section 35 execute only code is stored such that no literals are stored here. When compiling code literal pools can be removed but this does have a significant impact on code size and speed of processing. However, if it is only a small portion of the code that is compiled in this way the overall effect and performance and code size is extremely small. It should be noted that the size and location of section 35 can be set at initialization or it may be set by processing circuitry depending on the code currently being executed.

Another possible way of restricting the type of code that is stored in this section is to store any code here that can be called from a less secure function. The guard instruction is used when moving between domains and although it may in some embodiments be used to move both between more and less secure domains, it is clearly more important when moving from less secure to more secure and in some cases it is only in these instances that it is used. In such cases it is only code that can be called from a less secure function that is code that might have the guard instruction within it and thus, limiting the storage of this code to section 35 ensures that if a guard instruction is found elsewhere then this is a fault as it must be an is inadvertent encoding.

Although the mimicking of the guard instruction from data literals is clearly quite a difficult problem to avoid, the inadvertent encoding by instructions should be easier to address. However, in some cases, and in particular, where there are instructions of different lengths, then this itself can pose some problems.

Figure 6:
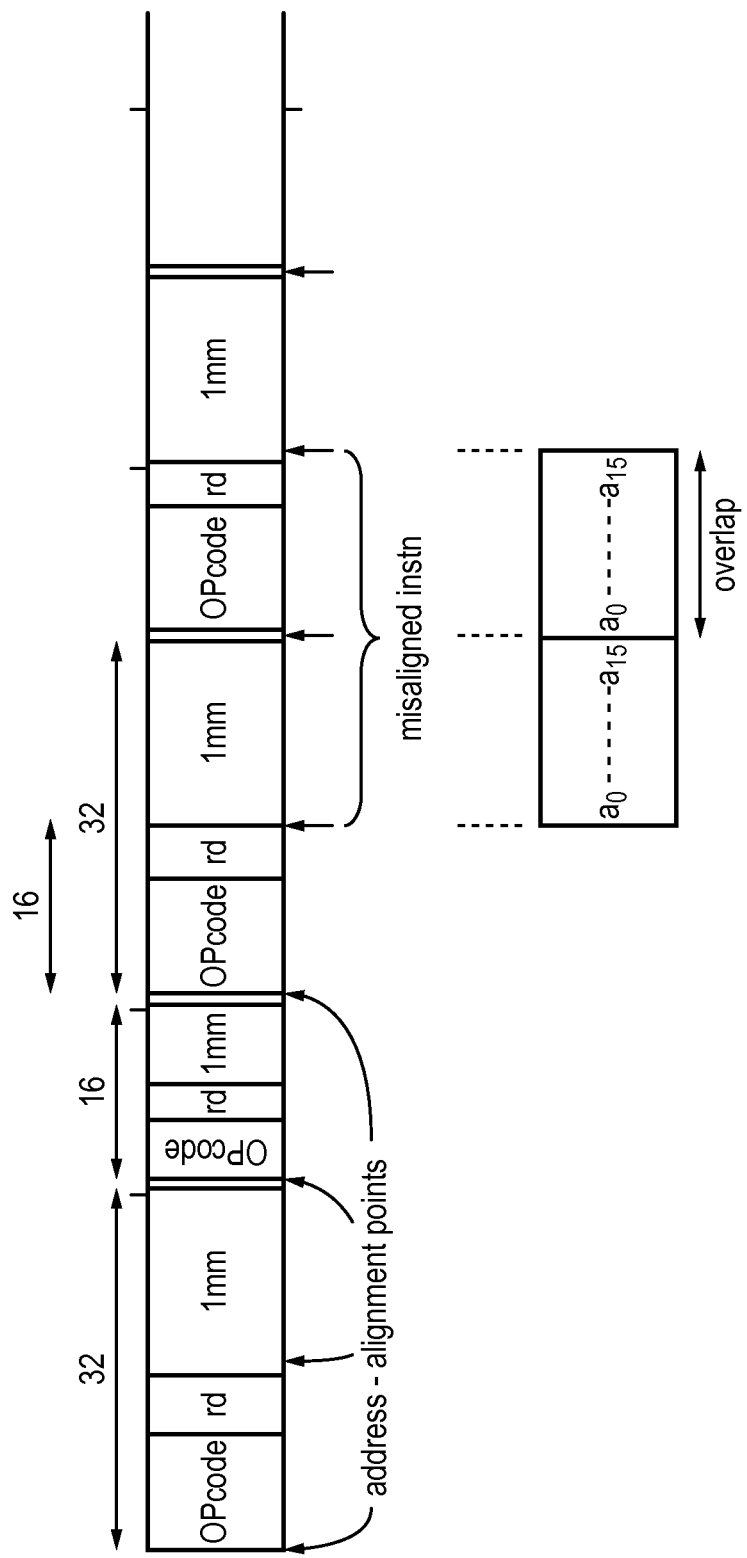
FIG. 6 shows how instructions can be misaligned with instructions having multiple lengths.

FIG. 6 for example shows an example of an instruction stream having two lengths of instructions, 32 bit instructions and 16 bit instructions. There are address alignment points that are required by the processing circuitry where the start of instructions must be located, and these occur every 16 bits, which corresponds to the smallest instruction length in this case. Each instruction starts with an operation or op-code which determines the function of the instruction and then there are further portions, in this example the destination register is identified and a data value or immediate is provided.

Trying to find useful code sequences by deliberately branching into the middle of instructions is a common technique when performing return orientated programming attacks. Thus, it is important not only that no instruction mimics the guard instructions but also that no misaligned encoding would accidentally mimic the guard instruction. In this case, there are only two instruction lengths and in order to avoid any inadvertent mimicking of the guard instruction the guard instruction is made to have the longest length and is made symmetrical with two portions each having the same value. In this way, each portion must not have an operation code or a starting section of an operating code of any other instruction as even when misaligned the latter portion will overlap with the start of the next instruction and thus, its operation code. Thus, by encoding the guard instruction in portions with equal values, it is only this value that is precluded from being used in operation codes and therefore, the amount of encoding space required to be dedicated to the guard instruction is reduced.

As you may imagine if you have more lengths of instructions which are not necessarily direct multiples of each other, then the address alignment points may become more frequent and at different possible positions within instructions. In such a case it is important that a guard instruction, if it starts within an instruction overlaps to the next instruction. In this way, the overlapping portion will sit on at least a portion of an op-code and provided this portion is invalid compared to any other op-code or start of an other op-code then the guard instruction cannot be mimicked by any instruction in the instruction set, even when branches don't target the beginning of an instruction.

Figure 7:
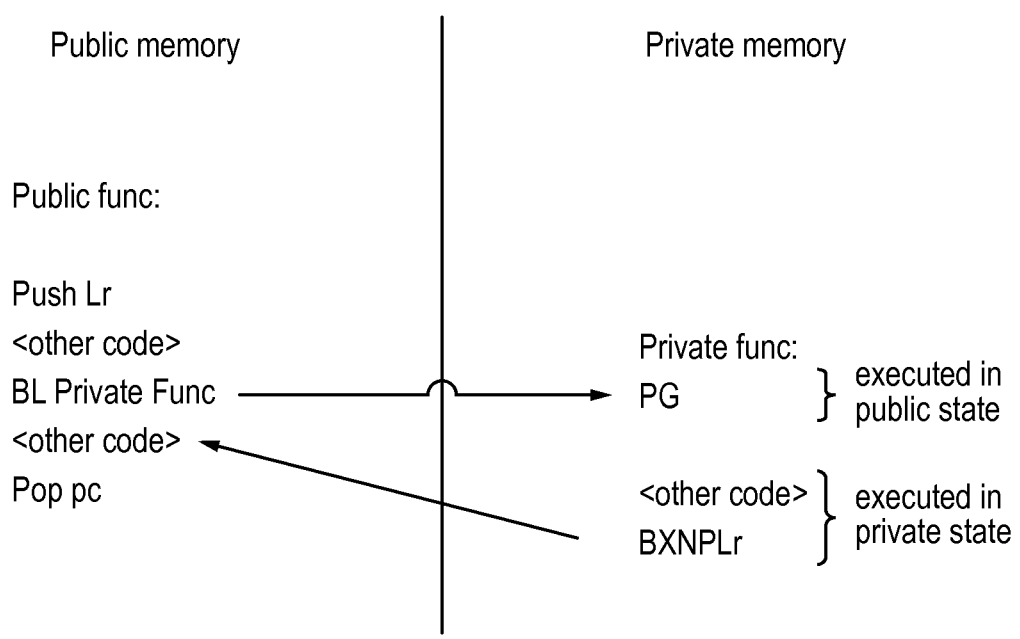
FIG. 7 shows code executing in a public domain and a private domain with a switch between the two.

FIG. 7 shows schematically a program stream being executed. Initially code stored in public memory is executed in the public processing domain and during this execution the previous link register value is saved to the stack and then a branch instruction is executed and this causes the processing circuitry to branch to code that is stored in private memory and to store a new branch return address in the link register. In this example the instruction that is fetched from private memory is the guard instruction and this is fetched while the processing circuitry is still operating in the public domain. Thus, a domain flag indicates the public domain and the MPU detects that the retrieved instruction is stored in private memory although the processing circuitry is executing in the public domain. The MPU indicates to the processing circuitry that an instruction in a more secure region than the secure level of the current domain has been fetched.

This triggers the processing circuitry to check that the instruction that has been fetched is a guard instruction and on verifying that it is, to switch the processing domain by setting the domain flag to indicate the private domain, such that the subsequent instructions stored within the private memory can be executed. The subsequent code is then executed, which starts with a security checking routine that ensures that the function call is valid and then a private function is executed.

In this way a branch to an instruction part way through a private function which would allow the security checking routine to be avoided cannot occur. This is because the instruction check which occurs in response to an instruction being fetched from a more secure region of memory than the secure level of the current operating domain would indicate that the instruction fetched is not a guard instruction and a security violation indication would be generated.

Figure 8:
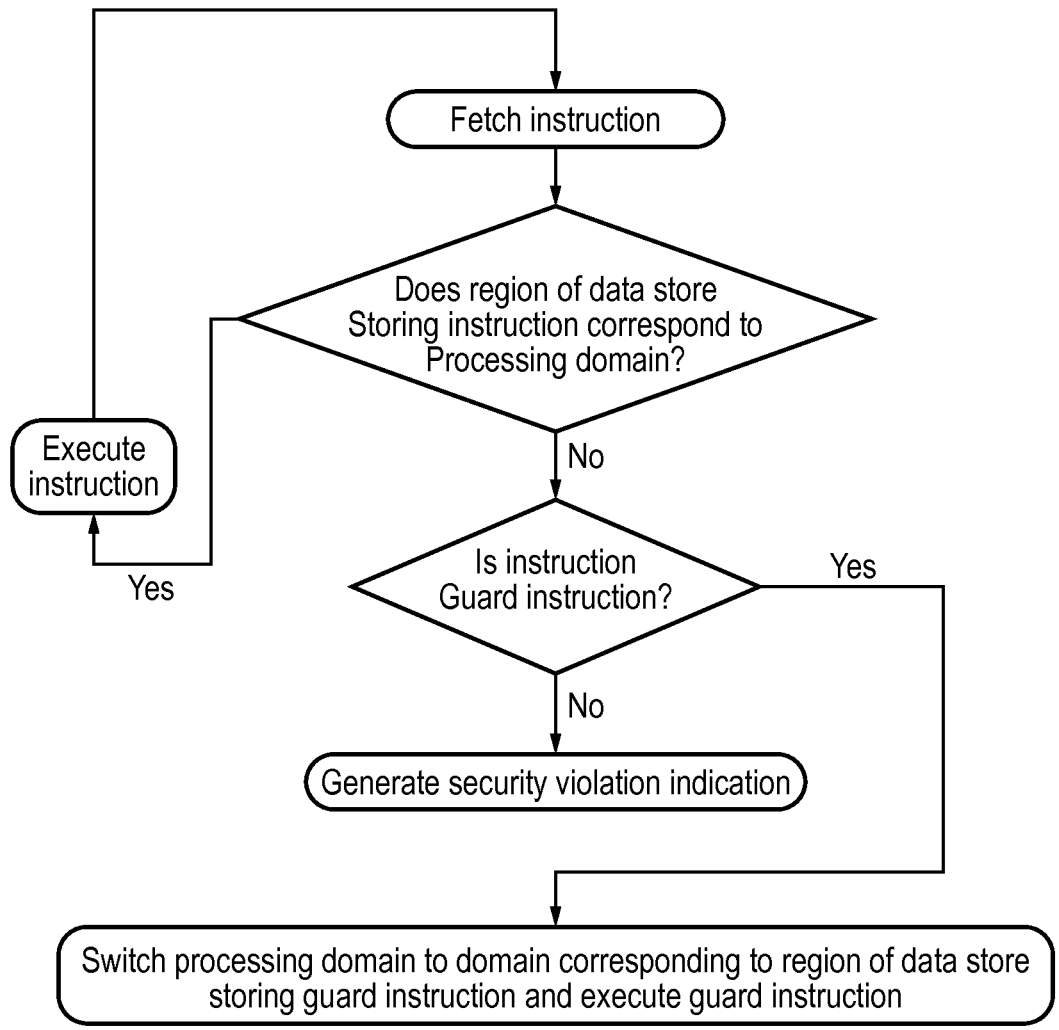
FIG. 8 shows a flow diagram illustrating steps in a method according to an embodiment of the present invention.

FIG. 8 shows a flow diagram illustrating steps according to method of an embodiment of the present invention. Initially an instruction is fetched and it is determined if the region of memory that it is fetched from corresponds to the current processing domain of the processing circuitry. This is done by looking at the domain flag 44 shown in FIG. 2.

If it does have a corresponding domain then the instruction is executed and the next instruction is fetched. If it corresponds to a different domain it is determined whether the instruction is a guard instruction or not. If it isn't a guard instruction then there has been a security violation and a security violation indication is asserted. If it is a guard instruction then the processing domain is switched to the processing domain corresponding to the region of the data store that stored the guard instruction, in this case the processing circuitry also executes the guard instruction before fetching the next instruction. In this way switching of domain only occurs when a guard instruction is found.

It should be noted that although this details a very general method where switching between different domains requires a guard instruction, in some embodiments such as that disclosed with regard to FIG. 7, the guard instruction is only required when switching from a less secure to a more secure domain and the initial evaluation is, is the secure level of the region of the date store storing the instruction more secure than the secure level of the processing domain and it is only if this is yes that the instruction is checked to verify whether or not it is a guard instruction, otherwise the instruction is simply executed.

Some further details of a particular embodiment are set out below.

NOTE: Some registers are banked between the public and private states, the following naming convention is used to define which version of the register should be accessed:—

Figure 9:
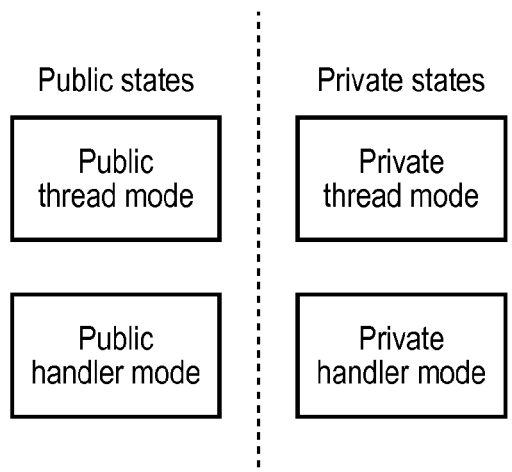
FIG. 9 shows an example of the different domains of operation.

<register name>—No specific version specified, the version associated with the current state is used. This notation is also used for register that are not banked <register_name>_P—The private version of the register is used <register_name>_NP—The non-private/public version of the register is used Private State A new private state is added to the core (and the wider system) that is orthogonal to the existing thread/handler modes, as shown in FIG. 9. Attempts to access resources marked as private when the system is executing in one of the public states results in a fault.

Which of these four states the processor is executing in is defined by a combination of the existing thread/handler logic, and a new architectural flag which is not directly visible to the software. In the pseudo code this flag is represented by a variable called CurrentState, which is defined as follows:— enumeration PrivacyState {PrivacyState_Public, PrivacyState_Private};
PrivacyState CurrentState;

Address Space Protection

It is assumed that all memories and other memory mapped peripherals that can be marked as private are on chip, and therefore encryption is not required in order to protect them. Any accesses to the address space include a new attribute P-Attr, which is used to mark transactions as public or private. The conveyance of P-Attr is implementation defined.

All address ranges marked as private are required to have their start and end addresses aligned to 32 byte boundaries.

The asset protection extensions require that:—

Areas of the address space marked as private must only be accessible by transactions with P-Attr set to private. Any accesses to private addresses with P-Attr set to public must result in an error being reported to the component that generated the request.

The processor be able to determine the privacy status of an address, this is accomplished by one of the following options:—
A PAU The asset protection extensions also define a new P-Req attribute, which defines the privacy state that the core requests the data transaction be performed in, unless otherwise specified P-Req is equal to the privacy state of the core.

MPU Extensions

The asset protection extensions expand the MPU functionality in the following ways:—
The MPU configuration registers are banked with privacy; the MPU memory attribution and privilege checking uses the configuration registers corresponding to the processors currently executing privacy state.
A privacy attribution unit (PAU)—This new block is responsible for attributing memory regions as either public or private.

Privacy Attribution Unit

The privacy attribution unit (PAU) performs the following functions:—
Early screening of transactions. This enables privacy violations to be caught early (i.e. before the memory access is performed) and reported in a meaningful way, instead of being reported as a BusFault.
Provides information about the privacy domain instructions are being fetched from.

The PAU configuration defines a number of memory regions, the number of regions is IMPLEMENTATION DEFINED and is discoverable by reading the PAU_TYPE.P-REGION field. These regions are named PAU_REGIONn, where n is a number from 0 to PAU_TYPE.PREGION−1. The configuration fields associated with these regions can't be directly accessed, but instead are indirectly accesses via window registers as shown in the following table:—

| PAU region configuration field | Associated window register field |
|---|---|
| PAU_REGIONn.VALID | PAU_RAR.VALID |
| PAU_REGIONn.NPC | PAU_RAR.NPC |
| PAU_REGIONn.BADDR | PAU_RBAR.BADDR |
| PAU_REGIONn.LADDR | PAU_RLAR.LADDR |

Figure 10:
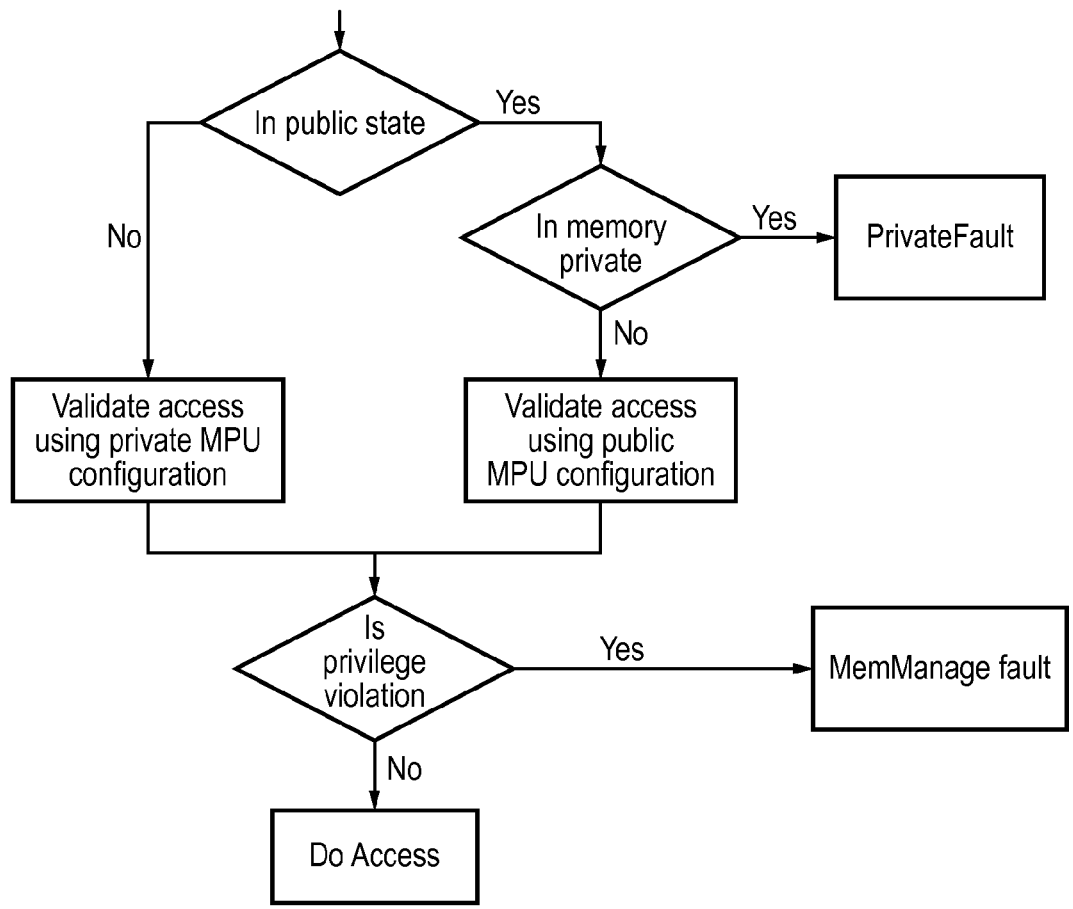
FIG. 10 shows a flow diagram illustrating memory attribute checking flow.

When a memory access is performed the PAU is queried. If the address matches one of the regions defined in the PAU (ie PAU_REGIONn.BADDR<=Address<PAU_REGIONn.LADDR) the memory is marked with the privacy state defined by the PAU_CTRL.RMNP bit. A PrivateFault is generated if a privacy violation is detected (e.g. an access to private memory with P-Req set to public). Requests that cause a PrivateFault to be generated do not result in a memory access being performed, similarly such accesses do not result in a MemManage fault being generated, regardless of the MPU configuration. In addition to syndrome information reported in PFSR the private version of the MMFAR register is used to store the address of the transaction that caused the fault. This fault is distinct from the MemManage fault as it indicates an attempt to breach the privacy of the private state, and therefore needs to be handled differently, as such the firmware vendors might want to assign different priorities to these two faults. The MPU configuration corresponding to the current state of the processor is used to perform privilege checks and memory attribution for accesses that don't generate a PrivateFault (see FIG. 10).

Clearing the PAU_CTRL.ENABLE field results in the following PAU behaviour:—
P-Attr is set to P-Req for data accesses, and private for instruction fetches.
For the purposes of instruction fetches the entire address space is reported as being private. This prevents the processor inadvertently transitioning to the public state during the boot process.

The configuration registers associated with the PAU are only accessible from a private privileged state, and accesses from any other states generate a BusFault.

PAU_CTRL

Privacy attribution unit control register, address 0xE000EDD0, Resets to 0x0 or IMPLEMENTATION DEFINED (see note below)

| 31 | 2 | 1 | 0 |
|---|---|---|---|
| Reserved | | RMNP | ENABLE |

ENABLE (bit[0]) When set to 1 the PAU is enabled
RMNP (bit[1]) Regions mark as non private, this bit controls how areas of memory are marked by the regions.
  0: Regions mark areas of memory as being private, addresses not matching any of the regions are marked as public.
  1: Regions mark areas of memory as being public, addresses not matching any of the regions are marked as private.

PAU_TYPE

Privacy attribution unit type register, address 0xE000EDD4, Read only

| 31 | 8 | 7 | 0 |
|---|---|---|---|
| Reserved | | PREGION | |

PREGION (bits[7:0]) The number of implemented PAU regions. If this field reads-as-zero the processor does not implement a PAU

PAU_RNR

Privacy attribution unit region number register, address 0xE000EDD8, Resets to UNKNOWN

| 31 | 8 | 7 | 0 |
|---|---|---|---|
| Reserved | | REGION | |

REGION (bits [7:0]) Selects the region currently accessed by the PAU_RBAR and PAU_RASR registers.

PAU_RBAR

Privacy attribution unit region base address register, address 0xE000EDDC, Resets to UNKNOWN

| 31 | 5 | 4 | 3 | 0 |
|---|---|---|---|---|
| BADDR | | VALID | REGION | |

REGION (bits[7:0]) Selects which region should be modified.
VALID (bit[4]) If set to 0 the REGION field is ignored and the value in the PAU_RNR register is used to define which region should be modified.

BADDR (bits[31:5]) Bits 31:5 of the base address of the region, NOTE: bits [4:0] of the base address are defined as 0x0.

PAU_RLAR

Privacy attribution unit region limit address register, address 0xE000EDE0, Resets to UNKNOWN

| 31 | 5 | 4 | 3 | 0 |
|---|---|---|---|---|
| LADDR | | VALID | REGION | |

REGION (bits[7:0]) Selects which region should be modified.

VALID (bit[4]) If set to 0 the REGION field is ignored and the value in the PAU_RNR register is used to define which region should be modified.

LADDR (bits[31:5]) Bits 31:5 of the limit address of the region, NOTE: bits [4:0] of the base address are defined as 0x0.

PAU_RAR

Privacy attribution unit region attribute register, address 0xE000EDE4, Resets to UNKNOWN

| 31 | 30 | 5 | 4 | 3 | 0 |
|---|---|---|---|---|---|
| NPC | Reserved | | VALID | REGION | |

REGION (bits[7:0]) Selects which region should be modified.

VALID (bit[4]) If set to 0 the REGION field is ignored and the value in the PAU_RNR register is used to define which region should be modified.

NPC (bit[31]) Non private callable. When NPC is set to 1 the region is marked as callable from the other privacy state. Any branches that cause a transition in privacy state that don't target a region with NPC set to 1 will result in a fault being raised. This provides an additional level of protection to the PG guard instruction and can be used to eliminate the risk associated with the guard instruction op code being present in literal pools. To reduce the number of PAU regions required it would be advantageous to group all the entry points to the private code together in a single region. Code in this region could be compiled as execute only and thus would not contain any literal pools CPU Generated Transactions Data Data accesses are generated with P-Attr set as follows:—
 If P-Req is set to public (e.g. the processor is in the public state) P-Attr is also set to public.
 For processors with a PAU—If P-Req is set to private (eg the processor is in the private state) and the address matches one of the regions in the PAU, P-Attr is set to PAU_CTRL.RMNP, if the address doesn't match a PAU region P-Attr is set to the opposite privacy state to PAU_CTRL.RMNP.

This prevents public code from reading from/writing to locations marked as private whilst providing easier integration M-profile core with PAU's into TrustZone enabled systems.

Instruction Fetch

The instruction fetch behaviour depends on whether the processor includes a PAU:—
 With PAU—Instructions are fetched with P-Attr set to PAU_CTRL.RMNP if the address matches one of the PAU regions. This P-Attr value is also used to determine the privacy state of the processor.

NOTE: If an instruction opcode spans the boundary between protection domains a PrivateFault is raised.

State Transitions

The privacy state an instruction should be executed in is inferred from the privacy status of the location the instruction was fetched from. As a result it is not possible to execute private code in the public state, or public code in the private state. However, in order to prevent attacks (e.g. return orientated programming) entry to a privacy state is strictly controlled by the following mechanisms:—
 All instruction fetches are performed with P-Attr set such that no privacy violation will be generated by the memory accesses, regardless of the state of the processor.
 One of the following actions will occur if the privacy state of the location an instruction was fetched from indicates the PC has moved to public code:—
  If the branch was marked as being a domain crossing the core transitions to the public state
  Otherwise a PrivateFault is raised. This situation can occur if the private code crashes, raising the fault can prevent any private register state being exposed to the public domain.
 Transitioning to the private state is done by branching to a private memory location that has been marked as a valid entry point by the presence of PG guard instruction. A branch to a PG in public memory does not cause a transition to the private state.

The guard instruction prevents public code being able to jump to arbitrary locations in the private code base. The presence of this guard instructions is checked for by the following pseudo code, which should be executed before the execution of every instruction, the details of which are described in the following sections:—

```
// PrivateEntryPointCheck( )
// =========================
PrivateEntryPointCheck( )
instState = InstMemState( );
if CurrentState != instPrivate then
    // if we're transitioning to private code by either an exception, linear code flow,
    // or by a branch check that the new instruction is a valid entry point (ie a PG).
    if instState == PrivacyState__Private && OpCode != 0xE97FE97F then
        ExceptionEntry(PrivateFault, TRUE);
        return;
    // If we've transitioned to the public state then there has been an uncontrolled
    // exit from the private state. So raise a fault
    if instState == PrivacyState__Public then
        ExceptionEntry(PrivateFault, TRUE);
        return;
```

This approach allows fast/efficient calling between domains, and permits an arbitrary number of entry points to the private code. Conceptually asset protection provide features between the private/public states similar to those already present between the privileged/privileged state, with the following differences (the details of which are outlined in subsequent sections):—
 Entry is gated by the PG instruction rather than the SVC exception.
  No change in execution priority—doesn't need to be factored into interrupt priority planning Not restricted to a single entry point—No routing/
proxying overhead Arguments can be passed via the registers (not possible
with SVC due to the possibility of exceptions occurring between the SVC instruction and the SVC exception handler)

When required (eg when there's more than 4 arguments)
passing arguments via the stack can be done quickly,
without the need for multiple conditional MRS
instructions to obtain the stack pointer Each entry point can be called from both the public and
private state Although this approach requires some special handling of private external API functions the majority of code in the private domain, and all the code in the public domain does not need any modification. In addition to increasing backwards compatibility this also enables legacy libraries, or compilers that have not yet been updated to support these extensions (eg GCC) to be used for entire of the public code base. It is worth noting that the private boundary functions that do require special handling could be implemented as simple assembly wrapper functions (that could potentially be automatically generating with some scripts). This allows the asset protection extensions to be used without specific compiler support.

Target State Bit

In several situations it simplifies the architecture if the processor knows which state it is transitioning to before it has fetched the first instruction from the new domain. The ARMv7-M architecture doesn't contain the ARM instruction set (and is very unlikely to require it in the future), as such bit zero of the branch target address (which is used as the ARM/Thumb interworking bit in the ARMv7-AR architecture) is currently unused. The asset protection extensions reuse this bit to signal the target state of a branch in private state as follows:— target_addr[0]=1, The target state of the branch is private.
Previously used to designate the Thumb instruction set.

target_addr[0]=0, The target state of the branch is public.
Previously reserved to designate the ARM instruction set.

Since the processor boots into the private state, and only the Thumb instruction set is supported, the architecture is backwards compatible with legacy code that branches to addresses with the LSB set to 1. When executing in the public state a branch to a location with target_addr[0] set to 0 results in INVSTATE UsageFault being raised, and branches with target_addr[0]=1 behave as normal branches and do not cause a transition to the private state, this approach has the following advantages:—

Prevents public code being able use leverage this bit as a possible attack vector.

Preserves the existing behaviour for legacy libraries or code compiled with legacy tools, that branch to addresses with the LSB set to 1.

In summary only private functions that call public code need to set the LSB of the call address to 0.

Function Calls to Private Code

When any branch (or linear code flow) causes a transition from public to private code the first instruction of the private code must be a PG instruction.

FIG. 7 shows a simple example of public code calling a private function highlighting where the domain transitions occur. Since processor remains in the public state until the PG instruction has been executed, the register state (including LR) is treated as untrusted, and therefore does not need protecting in the event that a public interrupt occurs between the BL and the PG. Another key feature is that the processor is returned to the public state after the BXNP LR instruction. This prevents return attacks by causing an exception to be generated if the next instruction is not in the public domain, or another PG instruction in the private domain. The BXNP lr instruction can determine the privacy state of the target in advance by examining the LSB of the LR register. Since the PG instruction automatically sanitises the return address, the LSB of the LR register can be trusted at this point.

Additional Instructions

PG

Private gateway. This guard instruction is used to indicate that an address is a valid branch target for branches from non private code. NOTE: This instruction fits into the UNPREDICTABLE space in the T1 encoding of LDRD (literal). See ARM ARMv7-M issue D section A7.7.50. This encoding has been deliberately picked because both the upper and lower 16 bit words have the same value, and just the top 16 bits mark the instruction as UNPREDICTABLE in the current ISA. This makes very unlikely that this bit pattern will be found in normal code, even if a branch is performed to the middle of a 32 bit instruction.

Encoding T1 Asset Protection Extensions

| PG | | | |
|---|---|---|---|
| 15 | 0 | 15 | 0 |
| 1110 1001 0111 1111 | | 1110 1001 0111 1111 | |

```
if InITBlock( ) then UNPREDICTABLE;
instState     = InstMemState( );
LR            = if CurrentState == PrivacyState_Private then
                  LR<31:1>:'1'
                else LR<31:1>:'0';
CurrentState  = instState;
```

The only side effects of this instruction are modifying LR[0] and updating the privacy state of the processor to match that of the location the instruction was fetched from. As such this instruction is defined as being executable from the public state.

Exceptions

Vector Table

The asset protection extensions add a second vector table, pointed to by a new VTORP register, which has the similar semantics as the current VTOR register and is banked at the same address as the existing VTOR register (accesses from the private state going to VTORP).

Any exceptions that target the private state use the VTORP register instead of VTOR to determine the base address of the vector table. To protect the private vector table it is important that VTORP points to an area of memory that is marked as private, and is therefore not accessible from the public state. The following rules are used to determine which state an exception targets:—

Exception Number<16: In general most of the low number exceptions target the state that the processor is currently in as determined by the CurrentState variable. The following exceptions deviate from the general rule:—

PrivateFault—Always targets the private state

PrivateFault

A new PrivateFault exception is defined with an exception number of 7. This exception is triggered by the various security checks that are performed (e.g. when jumping from public code to an address in private code that isn't marked as a valid entry point). Full details of all the cases that can generate this exception can be seen in the pseudo code through this specification.

The priority of PrivateFault can be configured using the PRI_7 field in the SHPR1 register. As such this field is defined RAZ/WI when accessed from the public state. PrivateFaults always target the private state, and as such exception number 7 in the public vector table is reserved.

PFSR

Private Fault Status Register, address 0xE000ED8C, Resets to UNKNOWN, Register not present in ARMv6-M Usage constraints:—
Write a one to a register bit to clear the corresponding fault.
The fault bits are additive; that is, if more than one fault occurs, all associated bits are set to 1.
Only accessible from the private privileged state, accesses from other states generate a BusFault.

| 31 | 6 | 5 | 4 | 3 | 2 | 1 | 0 |
|---|---|---|---|---|---|---|---|
| Reserved | | INVTRAN | INVALIGN | PAUVIOL | INVER | INVMS | INVEP |

INVEP (bit[0]) Invalid entry point. This bit is set if a function call from the public state or exception targets a non-PG instruction in the private state.

INVMS (bit[1]) Invalid magic signature. This bit is set if the magic signature in an exception stack frame is found to be invalid during the unstacking operation.

INVER (bit[2]) Invalid exception return. Indicates EXC_RETURN.SCRS was 0 when returning from an exception in the public state.

PAUVIOL (bit[3]) PAU violation. Indicates that an attempt was made to access parts of the address space that are marked as private with P-Req for the transaction set to public.

INVALIGN (bit[4]) Invalid alignment. This exception occurs where an instruction isn't aligned to the private domain boundary. IE the instruction crosses the boundary.

INVTRAN (bit[5]) invalid transition. This exception is raised when a branch that is not flagged as being a domain crossing causes a transition from private to public memory.

Misc PseUdo code

InstMemState( )

This pseudo code function returns the PrivacyState of the memory the current instruction was fetched from.

Various further aspects and features of the present invention are defined in the appended claims. Various modifications can be made to the embodiments herein before described without departing from the scope of the present invention.

The invention claimed is:

1. A data processing apparatus comprising:
   processing circuitry configured to perform data processing operations in response to program instructions, said processing circuitry having a plurality of domains of operation having different secure levels, comprising a secure domain and a further different secure domain, wherein when operating in said secure domain said processing circuitry has access to at least some data that is not accessible in said further different secure domain;
   a data store for storing data and instructions, said data store comprising a plurality of regions each corresponding to one of said plurality of domains of operation, and comprising at least one secure region for storing sensitive data accessible by said data processing circuitry operating in said secure domain and not accessible by said data processing circuitry operating in said further different secure domain and a less secure region for storing less sensitive data;
   said processing circuitry being configured:
   to verify for a program instruction to be executed that a region of said data store storing said program instruction to be executed corresponds to a current domain of operation of said processing circuitry; and
   in response to detecting that said program instruction to be executed is stored in a region of said data store that does not correspond to said current domain of operation of said processing circuitry:
   to verify whether said program instruction to be executed comprises a guard instruction; and
   if said program instruction to be executed comprises said guard instruction to switch said current domain of operation to a domain corresponding to said region of said data store storing said program instruction to be executed; and
   if said program instruction to be executed does not comprise said guard instruction to generate a security violation indication.

2. A data processing apparatus according to claim 1, wherein said further different secure domain comprises a domain that is less secure than said secure domain.

3. A data processing apparatus according to claim 1, wherein said processing circuitry is configured to verify whether said program instruction to be executed comprises a guard instruction only in response to detecting that said program instruction to be executed is stored in a region of said data store that corresponds to one of said domains that has a more secure level to said secure level of a current domain of operation of said processing circuitry.

4. A data processing apparatus according to claim 3, wherein in response to said program instruction to be executed being stored in a region of said data store that corresponds to one of said domains that has a less secure level to said secure level of a current domain of operation, said processing circuitry is configured to switch said current domain of operation to said less secure level whether or not said instruction comprises said guard instruction.

5. A data processing apparatus according to claim 1, wherein said processing circuitry is responsive to said security violation indication to generate an exception and execute fault handling code.

6. A data processing apparatus according to claim 1, wherein said processing circuitry is configured to execute program instructions from an instruction set having different length instructions, instruction address alignment required by said processing circuitry being dependent upon said different lengths, said guard instruction having a length that is long enough such that if a start of the guard instruction were located at one of at least a subset of said instruction address alignment points that is within one of said program instructions then a portion of said guard instruction will overlap with a start of a next instruction always extend beyond said instruction.

7. A data processing apparatus according to claim 6, wherein said at least a subset of said instruction address alignment points comprises all of said instruction address alignment points.

8. A data processing apparatus according to claim 6, wherein said length of said guard instruction is equal to a length of a longest program instruction from said instruction set.

9. A data processing apparatus according to claim 6, wherein said guard instruction is formed of a plurality of portions, at least two of said plurality of portions having a length of a smallest distance between said instruction address alignments required by said processing circuitry, said at least two of said plurality of portions having a same value.

10. A data processing apparatus according to claim 9, wherein said guard instruction comprises said two portions.

11. A data processing apparatus according to claim 9, wherein said same value is not a valid operation code or start segment of an operation code for any other instruction from said instruction set.

12. A data processing apparatus according to claim 6, wherein a value of any portion of said guard instruction that may overlap with another instruction from said instruction set when aligned with said address alignment required by said processing circuitry is not a valid operation code or start of an operation code for any other instruction from said instruction set.

13. A data processing apparatus according to claim 1, wherein said data store is configured not to store any data values as literals within program code that have the same value as the guard instruction.

14. A data processing apparatus according to claim 1, wherein said data processing apparatus is configured to segment said data store such that at least one predetermined section of said data store is allowed to validly store said guard instruction, said data processing circuitry being configured to generate a security violation indication in response to detecting said guard instruction located in a segment of said data store that is not said at least one predetermined section.

15. A data processing apparatus according to claim 14, wherein said at least one predetermined section is configured not to store any data values that have the same value as the guard instruction.

16. A data processing apparatus according to claim 14, wherein portions of said program code that can be called by program code stored in a less secure region of said data store, are stored in said at least one predetermined section.

17. A data processing apparatus according to claim 14, wherein said data store is configured to only store instructions in said at least one predetermined section.

18. A data processing apparatus according to claim 14, said data processing apparatus comprising memory access control circuitry for controlling access to said data store, said memory access control circuitry being configured to indicate said at least one predetermined section of said data store by setting at least one memory attribute marker within said memory access control circuitry.

19. A data processing apparatus according to claim 1, said processing circuitry being configured to process said guard instruction as a domain switching instruction and in response to said guard instruction to switch said current domain of operation to a domain corresponding to said region of said data store storing said guard instruction.

20. A data processing method for an apparatus comprising:
processing circuitry for performing data processing operations in response to program instructions, said processing circuitry having a plurality of domains of operation having different secure levels, comprising a secure domain and a further different secure domain, wherein when operating in said secure domain said processing circuitry has access to at least some data that is not accessible in said further different secure domain, and a data store for storing data and instructions, said data store comprising a plurality of different secure regions, each region corresponding to one of said plurality of domains of operation; the method comprising
(i) verifying for a program instruction to be executed, that a region of said data store storing said program instruction to be executed corresponds to a current domain of operation of said processing circuitry; and
(ii) in response to detecting that said program instruction to be executed is stored in a region of said data store that does not correspond to said current domain of operation of said processing circuitry:
(iii) verifying whether said program instruction to be executed comprises a guard instruction; and
(iv) if said program instruction to be executed comprises said guard instruction, switching said current domain of operation to a domain corresponding to said region of said data store storing said program instruction to be executed; and
(v) if said program instruction to be executed does not comprise said guard instruction generating a security violation indication.

21. A data processing apparatus comprising:
processing means for performing data processing operations in response to program instructions, said processing means having a plurality of domains of operation having different secure levels, comprising a secure domain and a further different secure domain, wherein when operating in said secure domain said processing means has access to at least some data that is not accessible in said further different secure domain;
a data storage means for storing data and instructions, said data storage means comprising a plurality of regions each corresponding to one of said plurality of domains of operation—, and comprising at least one secure region for storing sensitive data accessible by said data processing means operating in said secure domain and not accessible by said data processing means operating in said further different secure domain and a less secure region for storing less sensitive data;
said processing means being for:
verifying for a program instruction to be executed that a region of said data storage means storing said program instruction to be executed corresponds to a current domain of operation of said processing means; and
in response to detecting that said program instruction to be executed is stored in a region of said data storage means that does not correspond to said current domain of operation of said processing means:
verifying whether said program instruction to be executed comprises a guard instruction; and
if said program instruction to be executed comprises said guard instruction, switching said current domain of operation to a domain corresponding to said region of said data storage means storing said program instruction to be executed; and
if said program instruction to be executed does not comprise said guard instruction to generating a security violation indication.

* * * * *